United States Patent [19]
Tokito et al.

[11] 3,872,200
[45] Mar. 18, 1975

[54] METHOD OF PRODUCING FOAMABLE PELLETS

[75] Inventors: Takao Tokito; Yasushige Kawamoto, both of Fukuyama, Japan

[73] Assignee: Hiroshima Kasei, Ltd., Fukuyama-shi, Hiroshima-ken, Japan

[22] Filed: July 3, 1972

[21] Appl. No.: 268,559

[52] U.S. Cl............ 264/54, 260/2.5 B, 260/2.5 P, 264/117, 264/DIG. 5
[51] Int. Cl...... B29c 23/00, B29d 27/00, C08j 1/18
[58] Field of Search.......... 264/54, 51, DIG. 5, 117, 264/53, 54; 260/2.5 B, 2.5 P

[56] References Cited
UNITED STATES PATENTS

| | | | |
|---|---|---|---|
| 2,714,748 | 8/1955 | Stirnemann et al............ | 264/DIG. 5 |
| 3,121,911 | 2/1964 | Lightner.......................... | 264/95 X |
| 3,192,294 | 6/1965 | Streed et al..................... | 264/54 |
| 3,198,859 | 8/1965 | Tomlinson....................... | 264/DIG. 5 |
| 3,310,617 | 3/1967 | Dygert et al..................... | 264/53 |
| 3,555,133 | 1/1971 | Gentaz............................. | 264/117 X |
| 3,591,671 | 7/1971 | Burt et al......................... | 264/117 |

OTHER PUBLICATIONS

Kaufman, M., Edt. "Advances in PVC Compounding and Processing," London, MacLaren & Sons, 1962, pp. 85–92.
Penn, W. S. "PVC Technology," London, MacLaren & Sons, 1966, pp. 215–218.
Browning, Jon E. "Agglomeration: Growing Larger in Applications and Technology." In Chemical Engineering, Dec. 4, 1967, pp. 147–170.

Primary Examiner—Philip E. Anderson
Attorney, Agent, or Firm—Flynn & Frishauf

[57] ABSTRACT

A method of producing thermoplastic synthetic resin pellets characterized by agitating a mixture comprising thermoplastic synthetic resins, stabilizers, fillers, pigments and blowing agents while slowly dropping liquid plasticizers in the mixture to form spherical pellets for material for producing sheets for covering walls, ceiling, furniture and the like surface.

4 Claims, 1 Drawing Figure

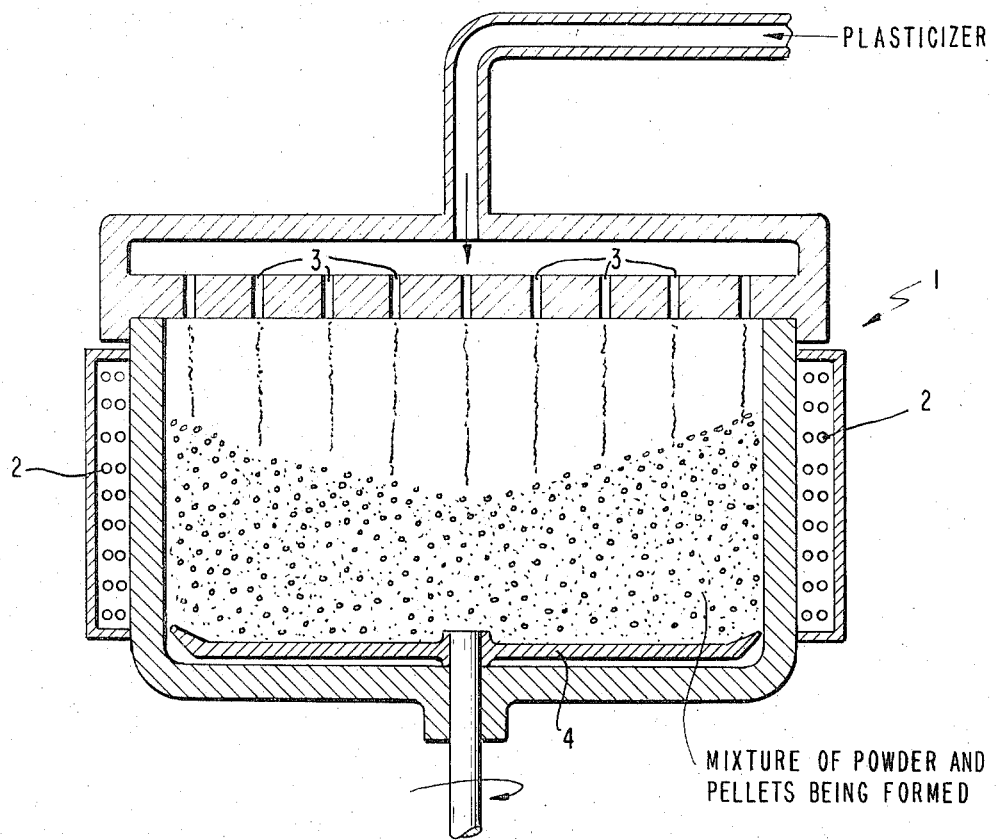

METHOD OF PRODUCING FOAMABLE PELLETS

BACKGROUND OF THE INVENTION

1. Field of the Invention

This invention relates to a method for producing thermoplastic synthetic resin pellets. More particularly, this invention relates to a method for producing spherical thermoplastic synthetic resin pellets of various diameters for material for producing sheets for covering walls, ceiling, furniture and the like surface.

2. Description of the Prior Art

A variety of methods have been proposed and practically employed for producing sheets for covering the walls and ceiling of a room and the like surface.

One of the conventional methods comprises the steps of mixing thermoplastic synthetic resin such as polyvinyl chloride and the like, plasticizer, stabilizer, filler and pigment together under agitation, kneading the obtained mixture at an elevated temperature, calendering the mixture into a sheet and cutting said sheet into pellets. Or instead of calendering the mixture into a sheet and cutting the sheet into pellets, the mixture may be extruded into a plurality of strips and said strips cut into pellets. Then the pellets are spread in a dense distribution over the surface of a paper or textile substrate and the substrate over which the pellets are spread is heated so as to cause the pellets to fuse and adhere to the surface of the substrate. Or, instead of heating the surface so as to cause the pellets to fuse and adhere to the substrate surface, the pellets may be spread over the surface of a paper or textile substrate on which adhesive has been previously applied so as to cause the pellets to adhere to the substrate surface. In another one of the prior art methods for producing sheets, a mixture comprising substantially the same composition as that employed in the first mentioned, that is, thermoplastic synthetic resin, plasticizer, stabilizer, filler and pigment, except for the addition of blowing agent thereto, is subjected to the treatment steps described hereinabove in connection with the first mentioned prior art method. The thus obtained sheet product is further subjected to an additional step in which the product is heated so as to decompose the blowing agent therein. The first-mentioned prior art method in which the pellets of the plastic mixture are spread over the substrate is generally known as the "calender type" method and involves the steps of mixing the component materials together under agitation, kneading the mixture at an elevated temperature, calendering the kneaded mixture into a sheet and cutting the sheet into pellets. Therefore, this method requires rather complicated equipment and also is troublesome. In the prior art method now under consideration, even if the calendering and cutting steps are replaced by extruding and cutting, since kneading at an elevated temperature is still required, this method also requires complicated equipment and is troublesome.

In both the prior art methods referred to above, it is necessary to heat the mixture material to a plasticizable molten state, so there is the possibility that the mixture material will be impaired by the action of heat. And when the mixture material includes a blowing agent therein, since heat generally causes a blowing agent to decompose and to froth prematurely the variety of blowing agents useful in such a method is inevitably limited to a substantially narrow group and the frothing method cannot give satisfactory appearance.

In addition, the pellets obtained by cutting a calendered sheet or cutting the strips are of different shapes including flat and pointed shapes. Therefore, when the pellets having such various shapes are spread over a substrate formed of paper or textile in a desired dense distribution, space is often left between adjacent pellets. With formation of such space, the pellets frequently fail to completely cover the pellet-applied surface of the substrate thereby leaving some areas of the substrate surface uncovered. Also, when the pellets having pointed shapes are spread over the substrate, they give the surface of the substrate a rough and unpleasant appearance. Pellets obtained by the mixture material having blowing agent previously incorporated in its composition will also have pointed shapes and similarly such pellets will give an unpleasant appearance to the product which may be caused by the frothing of the blowing agent in the mixture composition due to heat. In addition, according to the present invention, there is the advantage that the blowing agent to be employed is not subjected to any limitation and various conventional blowing agents can be advantageously employed in the mixture.

SUMMARY OF THE INVENTION

One object of the present invention is to provide a novel method for producing thermoplastic synthetic resin pellets for material for producing sheets for covering walls or ceiling.

Another object of this invention is to provide a method for producing thermoplastic synthetic resin pellets used for material for producing sheets for covering walls or ceiling which can effectively eliminate the difficulties encountered with the prior art methods and which is advantageous over the prior art corresponding methods by the fact that during the initial mixing-agitation step, the component materials are mixed together and formed into spherical pellets with which the overall procedure in the production of sheets is simplified.

Other objects, features and advantages will appear to one skilled in the art from the following non-limiting descriptions of illustrative examples and detailed description of the invention.

DETAILED DESCRIPTION OF THE INVENTION

This invention relates to a method for producing spherically shaped thermoplastic synthetic resin pellets having various diameters.

The method of the present invention comprises the steps of agitating a powdery mixture comprising 100 parts by weight of thermoplastic synthetic resin such as polyvinyl chloride or polyvinyl chloride copolymer, stabilizers, fillers, pigments and blowing agent at a temperature within the range of 30° – 120°C while slowly dropping 25 – 80 parts by weight of liquid plasticizer in the mixture so as to form spherical pellets. The pellets prepared by this invention have diameters ranging from 0.2 to 3.5 mm.

Sheets for covering the walls or ceiling can be produced by spreading the pellets of this invention over a substrate formed of paper or textile (if desired, adhesive may be previously applied to the substrate) in a dense distribution pattern and heating the substrate on which the pellets are distributed so as to fuse the pellets and at the same time, to cause the blowing agent to froth.

In accordance with this invention the mixture comprising polyvinyl chloride or polyvinyl chloride copolymer, stabilizer, filler, pigment and blowing agent is heated under agitation while a liquid plasticizer is slowly dropped over the mixture so as to form spherical pellets having diameters ranging from 0.2 to 3.5 mm and then, the thus obtained spherical pellets are spread over the paper or textile substrate in a dense distribution pattern with substantially no space thereby to give a pleasing nubbly appearance to the final product sheets. The surface of thus obtained sheet has superior touch and other characteristics to the corresponding products obtained by the prior art methods. And since the spherical pellets are formed during the initial mixing step at an elevated temperature accompanied by agitation, it is possible to substantially reduce the heat used during the pelletizing and also to eliminate the possibility of impairment of quality due to heat and other problems.

The characteristic features of the pellets prepared by this invention are such that because the pellets are spherical, even air spray coating can be easily effected on a surface to be coated together with vinyl acetate emulsion or acryl emulsion.

That is, while a powdery composition comprising polyvinyl chloride resin or polyvinyl chloride copolymer and auxiliary agents such as pigments excepting plasticizers is agitated, a plasticizer preheated at 30° to 120°C is added to said composition. The amount of plasticizer to be added is such that it will not dissolve all the powdery composition and also the amount depends on the temperature of the mixer in which the powdery composition is mixed and of the plasticizer above.

Some parts of the plasticizer-added polyvinyl chloride powdery composition dissolve, and the dissolved material then turns into partial gels. During agitation of the composition above, said gels grow and are repeatedly broken into little clusters so as to scatter the added plasticizers throughout the composition. Said little clusters move against one another and the friction develops spherical pellets.

In the above case, the state and degree of dispersion of the plasticizers throughout the composition depend upon the following conditions: the temperature of the plasticizer to be added, the amount of said plasticizers, the conditions for adding the plasticizers and the temperature of the tank in which the polyvinyl chloride powdery composition is agitated. On the other hand, the range of the spherical pellet diameters is determined by the degree of difficulty in breaking the gellated material by agitation. By means of controlling the above mentioned conditions, polyvinyl chloride spherical pellets of various diameters can be obtained. Spherical pellets within the desired range of diameters prepared by this invention are spread in a dense distribution pattern over any substrate of paper or textile and after being expanded by heat are cooled to solidify to produce a surface having pellets of various diameters and densities. Besides, the pellets cover the substrate surface without any gap between them, yet the surface is rough enough to give a three-dimensional effect.

As previously mentioned, the present invention possesses the merit that air spray coating can be effected on a surface to be coated by adding vinyl acetate emulsion and acryl emulsion. In addition to this merit, the spherical pellets of polyvinyl chloride resin and polyvinyl chloride copolymer of the present invention make coloring easier, are lighter and can be removed and replaced with new paper more at will compared with the those of prior arts.

Furthermore, because the spherical pellets are formed in the midst of churning and mixing the starting materials, the heat required throughout the process for forming the pellets can be remarkably reduced.

The types of thermoplastic synthetic resins which can be advantageously employed as principal materials in the method of the invention may be selected within a substantially wide range, but, in order to carry out the method of the invention commercially, it has been found that polyvinyl chloride resins and polyvinyl chloride copolymer give best results.

The preferred plasticizers are phthalic acid ester type plasticizer, that is dibutyl pthalate, diheptyl phthalate, di-2-ethylhexyl phthalate, dinormal-octylphthalate, dinonyl phthalate, diiso-decyl phthalate, etc. glycol ester type plasticizer, that is, diethylene glycol benzoate, dipentaerythritol hexaester etc. and phosphoric ester type plasticizer, that is tricresyl phosphate, trioctyl phosphate etc.

The preferred auxilizry plasticizers are aliphatic bis-basic acid ester type plasticizer, that is di-2-ethylhexyl adipate, di-butyl sebacate, di-2-ethylhexyl sebacate, aliphatic acid ester type plasticizer, that is butyl olate, epoxy type plasticizer, that is epoxide soybean oil, di-2-ethylhexyl hexahydrophthalate, butylepoxy stearate and chlorinated paraffin.

The preferred stabilizers are inorganic stabilizer, that is tribasic lead sulphate, dibasic lead and phosphite, metallic soap type stabilizer, that is lead stearate, dibasic lead stearate, cadminum stearate, cadmium laurate, barium stearate, calcium stearate, zinc and stearate, organo tin stabilizer, that is dibutyl tin dilaurate, dibutyl tin maleate, and dibutyl tin mercaptide, organic phosphorous ester type stabilizer, that is diphenyl decyl phosphite, trioctyl phosphite and trinonyl phenyl phosphite and the like.

The preferred fillers are calcium carbonate, magnesium carbonate, silic acid, aluminum silicate, magnesium silicate and the like.

The preferred blowing agents are sodium hydrogen carbonate, azodicarbonamide, dinitrosopentamethylenetetramine, P,P′-oxybisbenzensulfonyl hydrozide and the like.

Examples of inorganic pigments employed are titanium dioxide and organic pigments.

The drawing depicts a cross-section of an agitator (mixer) which may be used to carry out the process to the invention which is illustrated in the Examples.

For better understanding, the present invention will now be described in detail by way of specific examples of the invention which illustrate the invention, but are not intended to limit the scope of the invention in any way.

PREFERRED EMBODIMENTS OF THE INVENTION

Example 1

A powdery synthetic resin composition was prepared to the following formulation:

| | parts by weight |
|---|---|
| polyvinyl chloride resin | 100 |
| titanium dioxide | 5 |
| tribasic lead sulfate | 6 |
| magnesium carbonate | 30 |
| sodium hydrogencarbonate | 10 |

The above ingredients were charged into a mixer 1 and uniformly mixed together under agitation. The charge was heated by heating means 2 to within the temperature range of 20° to 40°C under agitation while slowly dropping 45 parts by weight of di-2-ethylhexyl phthalate in the mixture from 100 nozzles 3 provided over the top surface of the charge in an agitating tank 1 at the dropping rate of 0.6 parts 1 min. so that the di-2-ethylhexyl phthalate might cover the entire surface of the mixture. During said dropping, the agitator 4 was rotated at 120 R.P.M.

Three minutes after addition of the di-2-ethylhexyl phthalate, the agitation was stopped and spherical pellets having diameters ranging from about 1.0 – 2.5 mm were obtained in the yield of about 90%.

Example 2

A powdery synthetic resin composition was prepared to the following formulation:

| | parts by weight |
|---|---|
| polyvinyl chloride resin | 100 |
| titanium dioxide | 5 |
| tribasic lead sulphate | 6 |
| finely ground hydrated silica | 30 |
| azodicarbonamide | 3 |

The above mentioned composition was charged into a blending mixer and stirred well at a temperature in the range of from 50° to 60°C while slowly dropping 100 parts by weight of di-2-ethylhexyl phthalate maintained at a temperature of 100°C from 100 nozzles provided over the top surface of the charge in the mixer at a dropping rate of 50 parts/min.; during the dropping the rotational rate of the agitator was maintained at 120 R.P.M.

The agitation was stopped 3 minutes after the addition of di-2-ethylhexyl phthalate and spherical pellets having diameters ranging from 0.5 – 4.0 mm were obtained in the yield of about 80%.

Example 3

A powdery synthetic resin composition was prepared to the following formulation:

| | parts by weight |
|---|---|
| polyvinyl chloride resin | 100 |
| titanium dioxide | 5 |
| tribasic lead sulphate | 6 |
| finely ground hydrated silica | 60 |
| azodicarbonamide | 3 |

The above mentioned composition was charged into a blending mixer tank maintained at a temperature range of from 20° to 40°C and agitated. During said agitation, a composition comprising 100 parts by weight of polyvinyl chloride resin, 5 of titanium oxide, 6 of tribasic lead sulfate, 3 of azodicarbonamide and 100 of di-2-ethylhexyl phthalate which had been previously dissolved by means of a pulverizer and maintained at a temperature ranging from 20° to 40°C was dropped from the top of the blending mixer tank. The dissolved composition was dropped into the blending mixer tank over a period of 60 minutes, while the agitator was rotated at 120 R.P.M.

Agitation was stopped 5 minutes after the dropping of said dissolved composition and spherical pellets having diameters ranging from 0.5 to 2.0 mm were obtained in a 90% yield.

Example 4

A powdery synthetic resin composition was prepared to the following formulation:

| | parts by weight |
|---|---|
| polyvinyl chloride | 100 |
| titanium dioxide | 5 |
| tribasic lead sulfate | 2 |
| finely ground hydrated silica | 30 |
| sodium hydrogen carbonate | 10 |

The above mentioned resin composition was charged into a blending mixer tank maintained at a temperature ranging from 20° to 40°C and agitated. During said agitation the liquid composition comprising 10 parts by weight of di-2-ethylhexyl phthalate, 35 parts by weight of diheptylphthalate and 3 parts by weight of dibutyl-tin-dilaurate was introduced into the blending mixer tank by dropping over a period of 10 minutes, while the agitator was rotated at 120 R.P.M.

When the agitation was stopped about 10 minutes after the dropping of said liquid composition, spherical pellets having diameters ranging from 0.8 to 1.4 mm were obtained in a 70% yield.

What we claim is:

1. A method for producing foamable pellets having diameters ranging from 0.2 to 4.0mm comprising the step of agitating a powdered mixture comprising thermoplastic synthetic resin selected from the group consisting of polyvinyl chloride and polyvinyl chloride copolymer, stabilizers, fillers, pigments and blowing agents at the temperature within the range of 20°–60°C in a tank provided with nozzles and a stirrer in which the stirrer is rotating at a rotational speed within the range of 100 – 400 R.P.M. while slowly dropping through said nozzles a plasticizer for said thermoplastic resin in liquid form on to said powdered mixture, whereby said pellets are formed in said tank.

2. The method of claim 1 wherein said polyvinyl chloride and polyvinyl chloride copolymer are emulsion polymerization resin.

3. A method for producing foaming pellets having diameters ranging from 0.2 to 4.0mm comprising the step of agitating a powdered mixture comprising 80 – 120 parts by weight of thermoplastic synthetic resin selected from the group consisting of polyvinyl chloride and polyvinyl chloride copolymer, 2 – 8 parts by weight of stabilizer, 20 – 40 parts by weight of filler, 4–6 parts by weight of pigment and 8 – 12 parts by weight of blowing agent at a temperature within the range of 20°–60°C in a tank provided with nozzles and a stirrer in which the stirrer is rotating at a rotational speed within the range of 100 – 400 R.P.M. while slowly dropping through said nozzles 50 – 150 parts by weight of a mixture comprising 80 – 120 parts by weight of said thermoplastic synthetic resin, 2 – 8 parts by weight of stabilizer, 20 – 40 parts by weight of filler, 4 – 6 parts by weight of pigment, 8 – 12 parts by weight of blowing agent and 20 – 130 parts by weight of plasticizer for said thermoplastic resin over said powdered mixture whereby said pellets are formed in said tank.

4. The method of claim 3 wherein said polyvinyl chloride and said polyvinyl chloride copolymer are emulsion polymerization resin and wherein the rotational speed is 120 R.P.M.

* * * * *